US012724228B2

(12) United States Patent
Miller

(10) Patent No.: US 12,724,228 B2
(45) Date of Patent: Sep. 1, 2026

(54) MOVEABLE MIRROR AND OPTICAL CIRCUIT SWITCH

(71) Applicant: Calient.AI Inc., Goleta, CA (US)

(72) Inventor: Scott A. Miller, Ithaca, NY (US)

(73) Assignee: Calient.AI Inc., Goleta, CA (US)

(*) Notice: Subject to any disclaimer, the term of this patent is extended or adjusted under 35 U.S.C. 154(b) by 817 days.

(21) Appl. No.: 17/807,441

(22) Filed: Jun. 17, 2022

(65) Prior Publication Data

US 2023/0023348 A1 Jan. 26, 2023

Related U.S. Application Data

(60) Provisional application No. 63/213,489, filed on Jun. 22, 2021.

(51) Int. Cl.

| | |
|---|---|
| ***G02B 7/182*** | (2021.01) |
| ***G02B 1/02*** | (2006.01) |
| ***G02B 6/35*** | (2006.01) |
| ***G02B 17/00*** | (2006.01) |
| ***G02B 26/08*** | (2006.01) |

(52) U.S. Cl.

CPC ............ *G02B 7/1821* (2013.01); *G02B 1/02* (2013.01); *G02B 6/3518* (2013.01); *G02B 26/0833* (2013.01); *G02B 17/002* (2013.01)

(58) Field of Classification Search

None

See application file for complete search history.

(56) References Cited

U.S. PATENT DOCUMENTS

| | | | |
|---|---|---|---|
| 5,501,893 | A | 3/1996 | Laermer et al. |
| 6,538,799 | B2 | 3/2003 | McClelland et al. |
| 6,704,132 | B2 | 3/2004 | Dewa |
| 6,903,860 | B2 | 6/2005 | Ishii |
| 6,912,078 | B2 | 6/2005 | Kudrle et al. |
| 7,057,784 | B2 | 6/2006 | Miyajima et al. |
| 7,261,826 | B2 | 8/2007 | Adams et al. |
| 7,403,338 | B2 | 7/2008 | Wu et al. |
| 7,567,367 | B2 | 7/2009 | Ji |
| 7,782,514 | B2 | 8/2010 | Moidu |
| 8,345,336 | B2 | 1/2013 | Krastev et al. |
| 8,636,911 | B2 | 1/2014 | Chen et al. |
| 8,691,099 | B2 | 4/2014 | Gritters et al. |
| 8,873,128 | B2 | 10/2014 | Conrad et al. |
| 9,036,231 | B2 | 5/2015 | Zhou |
| 9,086,571 | B2 | 7/2015 | Zhou |

(Continued)

FOREIGN PATENT DOCUMENTS

WO 2022272237 A1 12/2022

OTHER PUBLICATIONS

Hall, et al., Mass reduction patterning of silicon-on-oxide-base micromirrors, J. Micro/Nanolith MEMS MOEMS 15(4):145501 (2016).

(Continued)

*Primary Examiner* — Ryan Crockett

(74) *Attorney, Agent, or Firm* — Vitruvian IP Law LLC; Cecily Anne O'Regan; Jeong Hee Seo

(57) ABSTRACT

Methods, apparatuses, and methods of manufacture are described that provide one or more fixed blades mounted to a frame or substrate, one or more movable blades mounted to each structure to be moved, and flexures on which the structures are suspended which reduces moment of inertia during use.

27 Claims, 16 Drawing Sheets

(56) References Cited

U.S. PATENT DOCUMENTS

| | | | | |
|---|---|---|---|---|
| 2002/0146200 | A1 | 10/2002 | Kudrle et al. | |
| 2005/0139542 | A1 | 6/2005 | Dickensheets et al. | |
| 2007/0053044 | A1 | 3/2007 | Kawakami et al. | |
| 2008/0018975 | A1* | 1/2008 | Moidu | B81B 3/007 359/226.1 |
| 2008/0137172 | A1* | 6/2008 | Staker | G02B 26/0841 359/291 |
| 2010/0039687 | A1* | 2/2010 | Kumar | G02B 26/0833 438/455 |
| 2010/0302609 | A1* | 12/2010 | Huber | G02B 26/0841 438/694 |
| 2012/0099176 | A1* | 4/2012 | Zhou | G02B 26/0841 359/290 |
| 2012/0287492 | A1* | 11/2012 | Lee | B81B 3/0078 29/829 |
| 2018/0314057 | A1* | 11/2018 | Yasumura | G02B 6/3518 |
| 2020/0363629 | A1 | 11/2020 | Duqi et al. | |

OTHER PUBLICATIONS

Marxer, et al., Vertical mirrors fabricated by deep reactive ion etching for fiber-optic switching applications, J. MEMS Systems, 6(3), 277-285 (1997).

* cited by examiner 10
516
514
510
20
410
522
512

516
510
10
514
522
512
20

510
10
20
521
550
521
540
538
522
512
539
572

510
556
554
10
552
560
540
538
512
539
572
20

MOVEABLE MIRROR AND OPTICAL CIRCUIT SWITCH

CROSS-REFERENCE

This application claims the benefit of U.S. Provisional Application No. 63/213,489, filed Jun. 22, 2021, entitled DESIGN AND FABRICATION OF A MICRO-MIRROR WITH REDUCED MOMENT OF INERTIA which application is incorporated herein in its entirety by reference.

TECHNICAL FIELD

This disclosure related to design and fabrication of a micro-mirror with reduced moment of inertia.

BACKGROUND

A MEMS (micro-electromechanical system) device is a micro-sized mechanical structure having electrical circuitry and is fabricated using various integrated circuit (IC) fabrication methods. One type of MEMS device is a microscopic gimbaled mirror device. A gimbaled mirror device includes a mirror component, which is suspended off a substrate, and is able to pivot about a gimbal due to electrostatic actuation. Electrostatic actuation creates an electric field that causes the mirror component to pivot. By allowing the mirror component to pivot, the mirror component is capable of having an angular range of motion in which the mirror component can redirect light beams to varying positions.

An optical switch is a switching device that couples light beams from an input fiber to an output fiber. Typically, the light beams from an input fiber are collimated and directed toward a desired location such as an output fiber. A movable mirror (e.g., a gimbaled mirror) in a switch mirror array redirects the light beams to desired locations. The maximum device switching speed is primarily limited by the resonant frequency at which the mirror component oscillates. The natural resonant frequency ($f_0$) of the device is given as:

$$f_0 = \frac{1}{2\pi}\sqrt{\frac{k}{I}},$$

where k is the torsional stiffness, and I is the moment of inertia about the axis of rotation. What is needed are MEMS mirror arrays and methods of manufacturing the arrays that reduce the moment of inertia of the mirrors in the array to increase the resonant frequency of the mirrors and increase the maximum device switching speed.

SUMMARY

One aspect of the disclosure provides a method of micro-mirror fabrication. The method includes forming a first photoresist layer on a first silicon on insulator (SOI) substrate. The first silicon on insulator (SOI) substrate includes a first silicon layer, a second silicon layer, and a first oxide layer between the first silicon layer and the second silicon layer. The method further includes forming a honeycomb recess pattern by etching the first photoresist layer and the second silicon layer. The method includes removing the first photoresist layer and disposing a second silicon on insulator (SOI) substrate on the first silicon on insulator (SOI) substrate. The second silicon on insulator (SOI) substrate includes a third silicon layer, a fourth silicon layer, and a second oxide layer between the third silicon layer and the fourth silicon layer. The method also includes removing the second oxide layer and the fourth silicon layer.

Another aspect of the disclosure provides a moveable mirror. The moveable mirror includes a stationary frame including a cavity, a movable frame disposed in the cavity, and a central stage disposed in the cavity. The central stage includes a plurality of recessed areas.

Implementations of the disclosure may include one or more of the following optional features. The movable mirror can include a mirror on the central stage (e.g., on an opposite side of a surface with the recessed areas). Additionally, the recessed areas can form a honeycomb pattern on a surface of the central stage. The plurality of recessed areas can have a variety of shapes including, but not limited to, at least one of a circular shaped recessed area, an oval shaped recessed area, a rectangular shaped recessed area, a parallelogram recessed area, a triangular recessed area, or a hexagon shaped recessed area. The movable mirror can also include a plurality of blades including a plurality of blades with a first blade and a second blade. The first blade can also overlap the central stage which includes the plurality of recessed areas. The movable mirror can also include a mirror cavity between the first blade and the second blade. A lid substrate and a base substrate can also be included in the moveable mirror wherein the lid substrate and the base substrate that includes the plurality of recessed areas. The plurality of recessed areas can also be overlapped with the mirror.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 5,501,893 A issued Mar. 26, 199t to Laermer et al.;
U.S. Pat. No. 6,538,799 B2 issued Mar. 25, 2003 to McClelland et al.;
U.S. Pat. No. 6,704,132 B2 issued Mar. 9, 2004 to Dewa;
U.S. Pat. No. 6,903,860 B2 issued Jun. 7, 2005 to Ishii;
U.S. Pat. No. 6,912,078 B2 issued Jun. 28, 2005 to Kudrle et al.;
U.S. Pat. No. 7,057,784 B2 issued Jun. 6, 2006 to Miyajima et al.;
U.S. Pat. No. 7,261,826 B2 issued Aug. 28, 2007 to Adams et al.;
U.S. Pat. No. 7,403,338 B2 issued Jul. 22, 2008 to Wu et al.;
U.S. Pat. No. 7,567,367 B2 issued Jul. 28, 2009 to Ji;
U.S. Pat. No. 7,782,514 B2 issued Aug. 24, 2010 to Moidu;
U.S. Pat. No. 8,345,336 B2 issued Jan. 1, 2013 to Krastev et al.;
U.S. Pat. No. 8,636,911 B2 issued Jan. 28, 2014 to Chen et al.;
U.S. Pat. No. 8,691,099 B2 issued Apr. 8, 2014 to Gritters et al.;
U.S. Pat. No. 8,873,128 B2 issued Oct. 28, 2014 to Conrad et al.;
U.S. Pat. No. 9,036,231 B2 issued May 19, 2015 to Zhou;
U.S. Pat. No. 9,086,571 B2 issued Jul. 21, 2015 to Zhou;
US 2005/0139542 A1 published Jun. 30, 2005 to Dickensheets et al.;

US 2007/0053044 A1 published Mar. 8, 2007 to Kawakami et al.;

MARXER, et al., Vertical mirrors fabricated by deep reactive ion etching for fiber-optic switching applications, J. MEMS Systems, 6(3), 277-285 (1997); and HALL, et al., Mass reduction patterning of silicon-on-oxide-base micromirrors, J. Micro/Nanolith MEMS MOEMS 15(4): 145501 (2016).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Disclosed are MEMS mirror arrays and methods of manufacturing the arrays that provide the MEMS with a reduced moment of inertia of the micro-mirror to achieve a higher resonant frequency. The higher resonant frequency results in less coupling to environmental vibrations such as accelerations from shocks, earthquakes or other sources of vibration. Additionally, the higher resonant frequency results in a reduced requirement to isolate the system containing the MEMS from the vibration. Also, faster switching speeds are possible when the mirrors are used in an optical switch. All these results are achievable by integrating a honeycomb pattern into the backside of the mirror during the fabrication process.

Figure 1:
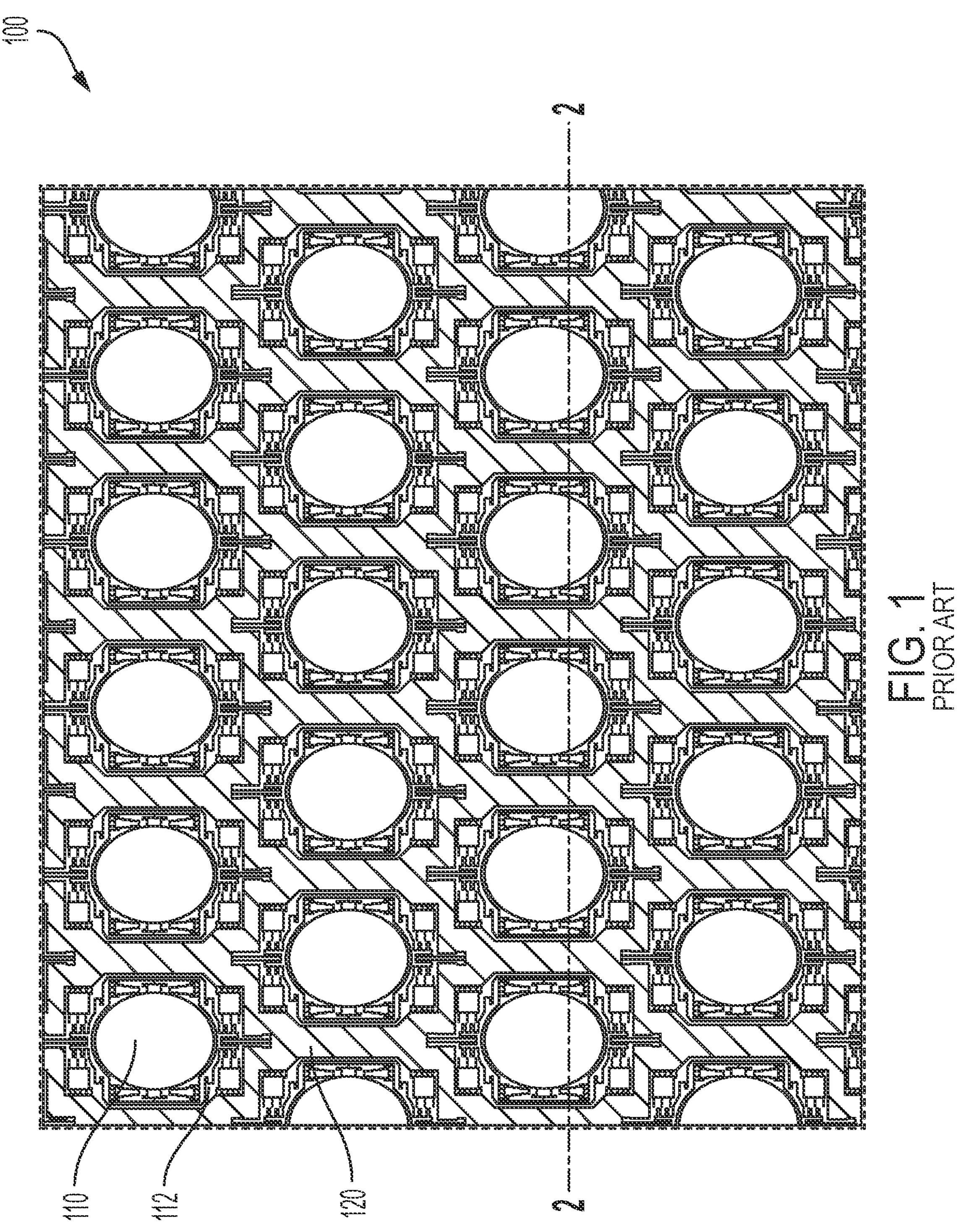
FIG. 1 illustrates a portion of a prior art mirror array.

FIG. 1 illustrates an upper layer view of a portion of a prior art MEMS mirror array 100. The MEMS mirror array 100 has a metal layer 110, a mirror cavity 112, and a support 120.

As will be appreciated by those skilled in the art, a MEMS array 100 has multiple stage actuators. Each actuator in an array includes a central stage, a movable frame, and a stationary frame. The stationary frame can form a cavity in which central stage and movable frame are disposed. A reflective element (e.g., a mirror) may be coupled to central stage and suspended from movable frame by a first central stage flexure and a second central stage flexure. The reflective element may be used to redirect a light beam along an optical path different from the optical path of the received light beam. An actuator that includes a mirror on the central stage is also referred to as a mirror cell or a MEM actuator with a mirror.

The rotation of the central stage can be independent of the rotation of movable frame. An actuator thus can allow decoupled motion. For example, central stage can rotate with respect to stationary frame while movable frame remains parallel and stationary with respect to the stationary frame. In addition, movable frame can rotate with respect to the stationary frame while central stage remains parallel (and stationary) with respect to the movable frame. The moveable frame engages the stationary frame via a first stationary frame flexure and a second stationary frame flexure. Furthermore, the central stage and the movable frame can, for example, both rotate concurrently yet independently of each other. Thus, for example, the central stage, movable frame, and stationary frame can concurrently be non-parallel and decoupled with respect to each other during actuation.

The first central stage flexure and the second central stage flexure are coupled to the movable frame via a first end bar and a second end bar. The first end bar and the second end bar are, in turn, attached to the main body of movable frame using multiple support members. Support members are silicon dioxide beams providing a tensioning force. The support members provide a tensioning force by expanding a different amount than the material system used in moveable frame, central stage, first end bar, second end bar, and stationary frame. Material systems of differing expansion can be placed into the movable frame in order to put the first central flexure and the second central flexure into tension. In particular, the expansion provided by connection members acting against the moveable frame and the first and second end bars causes a tensioning force on each pair of the central stage flexure and the stationary frame flexure. Support members serve to apply a tension force in order to minimize the potential for positional distortions due to buckling of the flexures under compressive forces. Generally, if any of the flexures are under too great a compressive force, the flexures may buckle. As such, support members may be coupled between the main body of movable frame and first and second end bars at a non-perpendicular angle in order to pull on central stage flexures to place them in tension. Because stationary frame flexures are perpendicular to central stage flexures, the non-perpendicular angle of attachment of support members causes a pull on the main body of movable frame and, thereby, a pull on and a tensioning of stationary frame flexures.

Support members may be coupled between the main body of movable frame and the first and second end bars can be positioned at approximately a 45 degree angle. Alternatively, support members may be coupled between the main body of movable frame and the first and second end bars at an angle less than or greater than 45 degrees.

Central stage flexures allow the central stage to pivot. Central stage flexures also provide some torsional resistance proportional to the rotation angle, but substantially less resistance than all other directions. In other words, there is substantial resistance to undesired twisting movement of central stage in other directions (e.g., side-to-side, or around an axis perpendicular to the surface of central stage). Moreover, central stage flexures extend into a corresponding slot formed in the central stage in order to provide sufficient length to the flexures for appropriate flexibility and torsion resistance. The central stage flexures may have a length of approximately 100 microns, a height of approximately 10 microns, and a width of approximately 1 micron, resulting in a 10:1 aspect ratio. Such an aspect ratio may provide for greater compliance in the direction of desired motion and stiffness in the undesired directions. In an alternative implementation, other lengths, heights, widths, and aspect ratios may be used.

Similarly, stationary frame flexures enable the movable frame to pivot while providing resistance to undesired twisting movement of movable frame in other directions (e.g., side-to-side, or around an axis perpendicular to the surface of movable frame). Stationary frame flexures extend into slots a pair of corresponding slots formed into movable frame and stationary frame in order to provide sufficient length to the flexures for appropriate flexibility and torsion resistance.

One or more of the central stage flexures and stationary frame flexures may comprise a pair of torsion beams. The use of multiple torsion beams may provide for increased resistance to undesired twisting movement of a frame or stage, as compared to a single beam flexure. A pair of torsion beams may have various configurations. Torsion beams may be non-parallel beams with ends near the movable frame are substantially parallel and spaced apart by a gap. The gap between torsion beams reduces along the length of the beams such that the ends of the beams near fixed frame are closer together than the ends of the beams near movable frame. The angling of torsion beams relative to each other may aid flexure to resist unstable twisting modes. In an alternative implementation, torsion beams may be configured such that their ends near fixed frame are farther apart than their ends near movable frame. In yet another implementation, torsion beams may be substantially parallel to each other such that gap is substantially uniform along the length of the beams.

Figure 2:
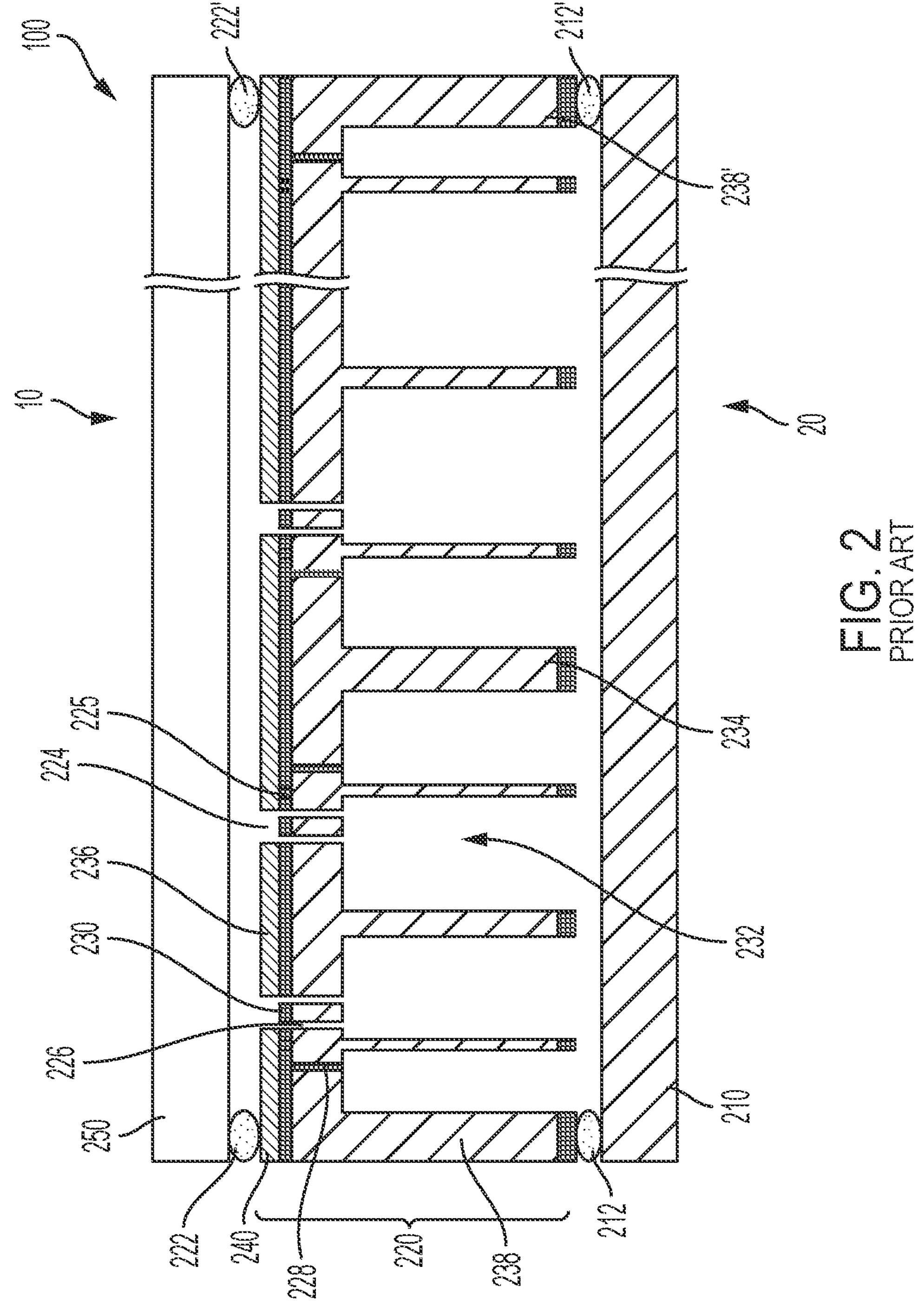
FIG. 2 illustrates a cross-section of the prior art mirror array of FIG. 1 taken along the lines 2-2.

FIG. 2 illustrates a partial cross-section of a prior art MEMS mirror array 100 taken along the lines 2-2 in FIG. 1 with a topside 10 and a bottom side 20 where each layer within the MEMS mirror array 100 has a layer top surface oriented towards topside 10 and a bottom surface oriented towards bottom side 20. The array has a base wafer 210 and a lid wafer 250. The base wafer 210 has a first pair of bonding elements 212, 212' at either end of the base wafer layer which bonds the base wafer 210 to the device wafer 220. The bonding elements 212, 212' can provide a hermetic seal when bonded. A second pair of bonding elements 222, 222' bond the device wafer 220 to the lid wafer 250.

Structure release is accomplished at the upper surface (topside 10) of the lid wafer 250 using dry etching, which punctures through a plurality of structure trenches 226 to suspend the movable elements of the mirror 224 and the frame 230. In addition, the release etch promotes electrical isolation by separating, for example, the silicon of the frame 230 from the silicon of surrounding members 238, 238'. The vias 225 serve to connect the regions of silicon to the metal interconnects 240. To completely seal the mirrors from the outside environment, a lid wafer 250 is bonded to the device wafer 220, through, for example, the second pair of bonding elements 222, 222' which are a frit glass seal. The lid wafer 250 is typically glass to allow incoming light to be transmitted with low loss in the mirror cavity 232, reflect off of the upper surface of mirror 236, and transmit out of the mirror cavity. Isolation trenches 228 are filled with a dielectric material such as silicon dioxide. Once filled, the isolation trenches 228 provide the electrical isolation between blades after the mirror is released.

Figure 3:
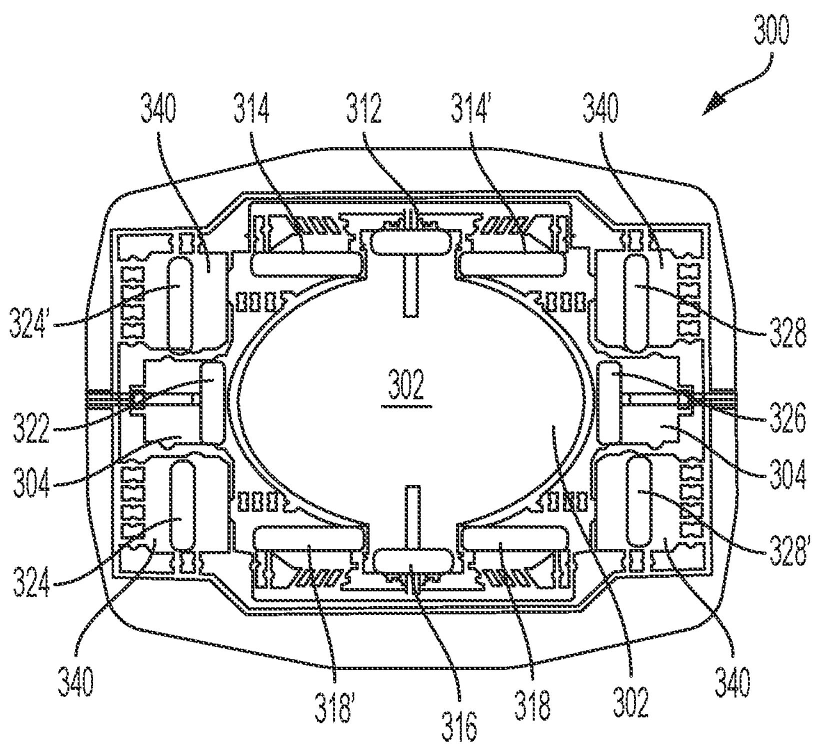
FIG. 3 illustrates an exemplar individual mirror from a mirror array.

FIG. 3 illustrates a layout of an individual mirror configured with an actuator 300 according to some implementations of the present disclosure. As shown in FIG. 3, in some implementations, the actuator 300 uses a single movable blade (e.g., first side blade 322) with two corresponding fixed blades (e.g., first side flanking blades 324, 324') as an actuation mechanism structure to enable rotation. As illustrated, in some implementations, the actuator 300 uses two such actuation mechanism structures per stage and two such actuation mechanism structures per frame. Accordingly, a plurality of blades are provided.

In some implementations, a first blade 312 is coupled to stage 302 and is flanked on either side by a pair of first flanking blades 314, 314' which are coupled to moveable frame 304 on opposite ends of first blade 312. As illustrated, the stage 302 is pivotally coupled to moveable frame 304 such that first blade 312 is configured to move relative to first flanking blades 314, 314'. When a potential difference is applied between first blade 312 and one of the first flanking blades 314, 314', an attraction is generated between the blades causing stage 302 to pivot. For example, first blade 312 may be held at a ground potential while an active voltage is applied to either of the first flanking blades 314, 314'. The application of an active voltage to first flanking blade 314, for example, will attract the first blade 312, thereby causing stage 302 to rotate in a corresponding direction. Similarly, the application of an active voltage to first flanking blade 314' will attract first blade 312 and cause stage 302 to rotate in an opposite direction to that resulting from the attraction to first flanking blades 314.

A second blade 316 can also be coupled on end of stage 302 opposite the location of the first blade 312, with a pair of second flanking blades 318, 318' coupled to moveable frame 304 on an opposite ends of second blade 316. Second blade 316 moves relative to second flanking blades 318, 318'. In order to provide the desired motion of stage 302 and to resist unwanted rotations, actuation voltages are applied concurrently with respect to first blade 312 and second blade 316. When the potential difference is applied between the second blade 316 and one of second flanking blades 318, 318', an attraction is generated between the blades resulting in the rotation of stage 302 in a manner similar to that discussed above with respect to the first blade 312. The use of actuation mechanisms in tandem on each end of stage 302 reduces or minimizes undesired twisting of the stage 302 to provide for more uniform rotation.

A similar actuation mechanism structure may be used for rotation of moveable frame 304. A first side blade 322 can also be coupled to moveable frame 304, and first side flanking blades 324, 324' are coupled to a stationary frame 340 on opposite ends of first side blade 322.

Moveable frame 304 is pivotally coupled to the stationary frame 340 such that first side blade 322 is configured to move relative to first side flanking blades 324, 324'. When a potential difference is applied between first side blade 322 and one of the first side flanking blades 324, 324', an attraction is generated between the blades causing the moveable frame 304 to pivot in a manner similar to that discussed above in relation to stage 302.

A second side blade 326 is coupled on the opposite end of moveable frame 304, with second side flanking blades 328, 328' coupled to the stationary frame 340 on opposite ends of second side blade 326. Second side blade 326 moves relative to second side flanking blades 328, 328'. When the potential difference is applied between second side blade 326 and one of second side flanking blades 328, 328', an attraction is generated between the blades facilitating the rotation of moveable frame 304. The use of actuation mechanisms in tandem on each end of moveable frame 304 reduces or minimizes undesired twisting of the frame to provide for more uniform rotation.

Alternatively, a stage 302 or frame may only have an actuation mechanism structure on only a single end. For another implementations, the actuator 300 may have other actuation mechanism structures without departing from the scope of the disclosure.

FIGS. 4A-D illustrate configurations for a recessed area 410 or honeycomb including recessed and un-recessed areas. As will be appreciated by those skilled in the art, the patterns presented are representative and other patterns can be employed without departing from the scope of the disclosure. The recessed area 410 in FIG. 4A has four separate sections having a circular or oval shape in two dimensions, where each section is a quarter of the two dimensional shape according to some implementations of this disclosure. The recessed area appears as a quarter of a circle or oval and the un-recessed area appears as an X that cross-sects the recessed area. The un-recessed areas can be symmetrical or substantially symmetrical as shown.

Figure 4B:
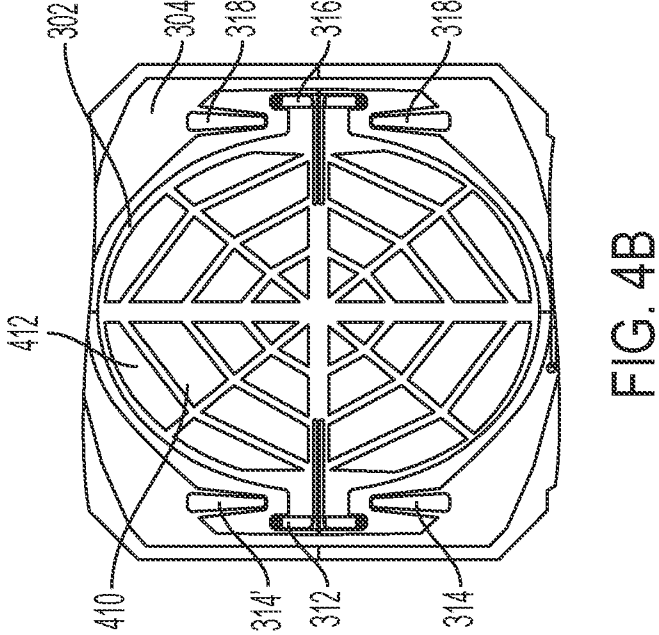
FIGS. 4A-4D illustrate a variety of configurations for a MEMS with recessed areas operable to reduce a moment of inertia.
Figure 4A:
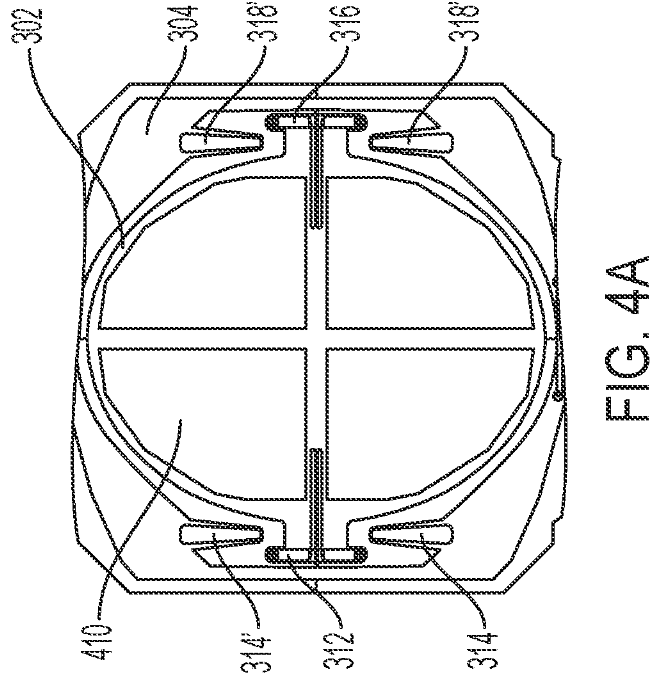
Figures 4C, 4D:
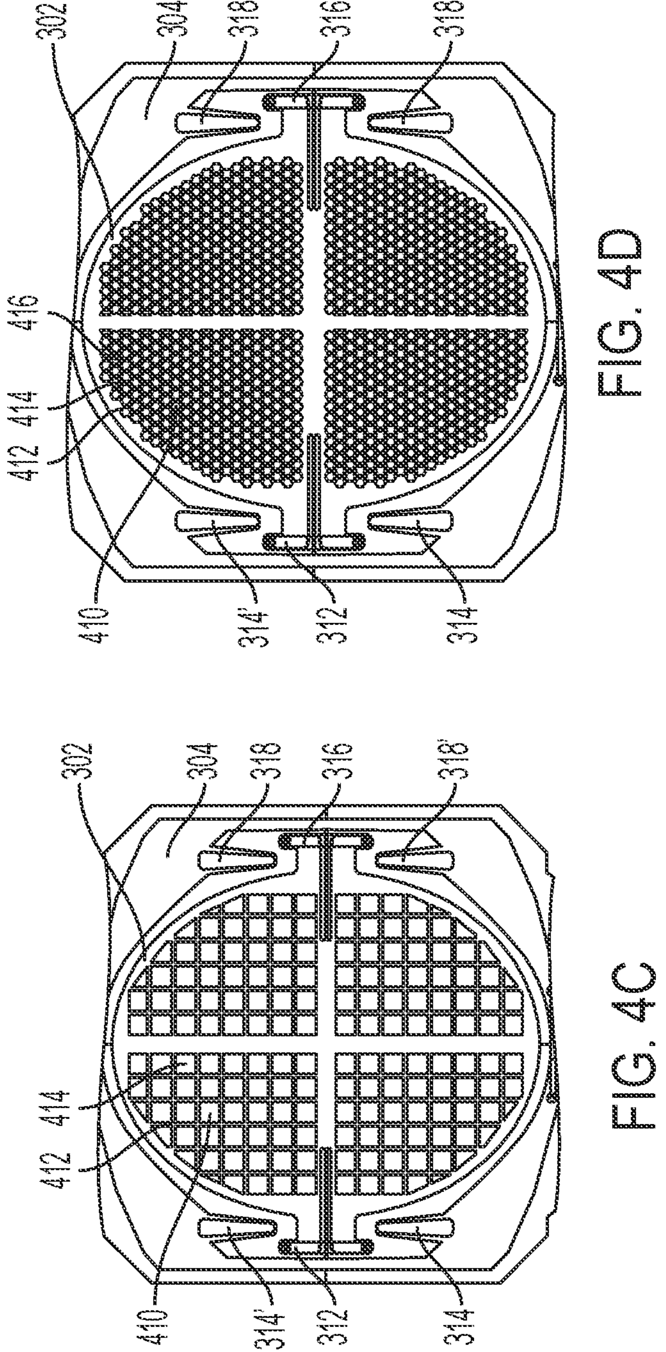

Turning to FIG. 4B, in some implementations, the recessed area 410 further breaks the quarter sections in FIG. 4A into sub-sections with additional separations 412 between the recessed areas. The additional separations 412 create un-recessed areas that have a concentric pattern of recessed to un-recessed areas, such as concentric circles. In FIG. 4C, in some implementations, further breaks are provided that provide separations 414 between the recessed areas and the un-recessed areas that are square. In FIG. 4D, in some implementations, further breaks are provided that provide separations 416 between the recessed areas and the un-recessed areas that are hexagons can be circular or oval. Other shapes, such as rectangular, parallelogram, triangular, etc. can be used without departing from the scope of the disclosure. The number of recessed areas can range from, for example, two or more, three or more, four or more, six or more, eight or more, to two hundred or more.

Figures 5A, 5B:
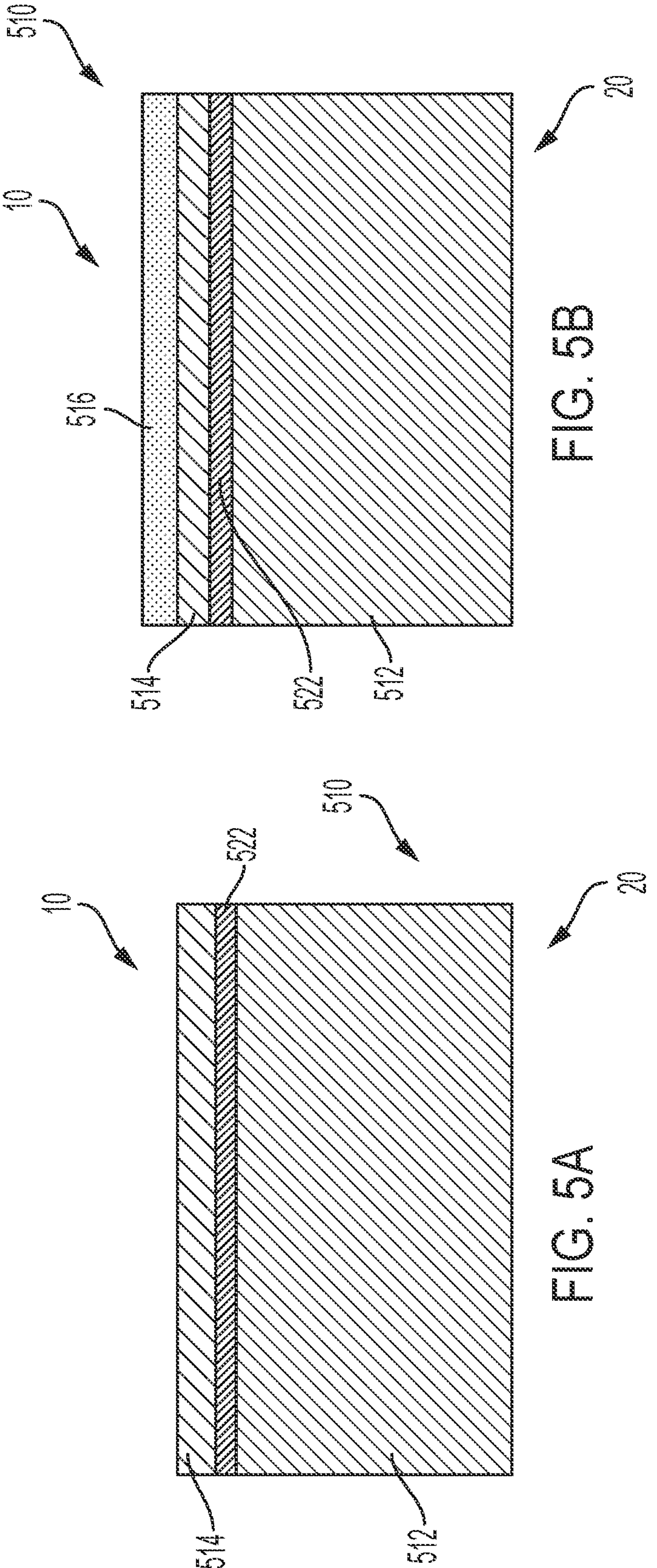
FIGS. 5A-5R illustrate process steps to fabricate micromirrors with honeycombed recesses.
Figures 5C, 5D:
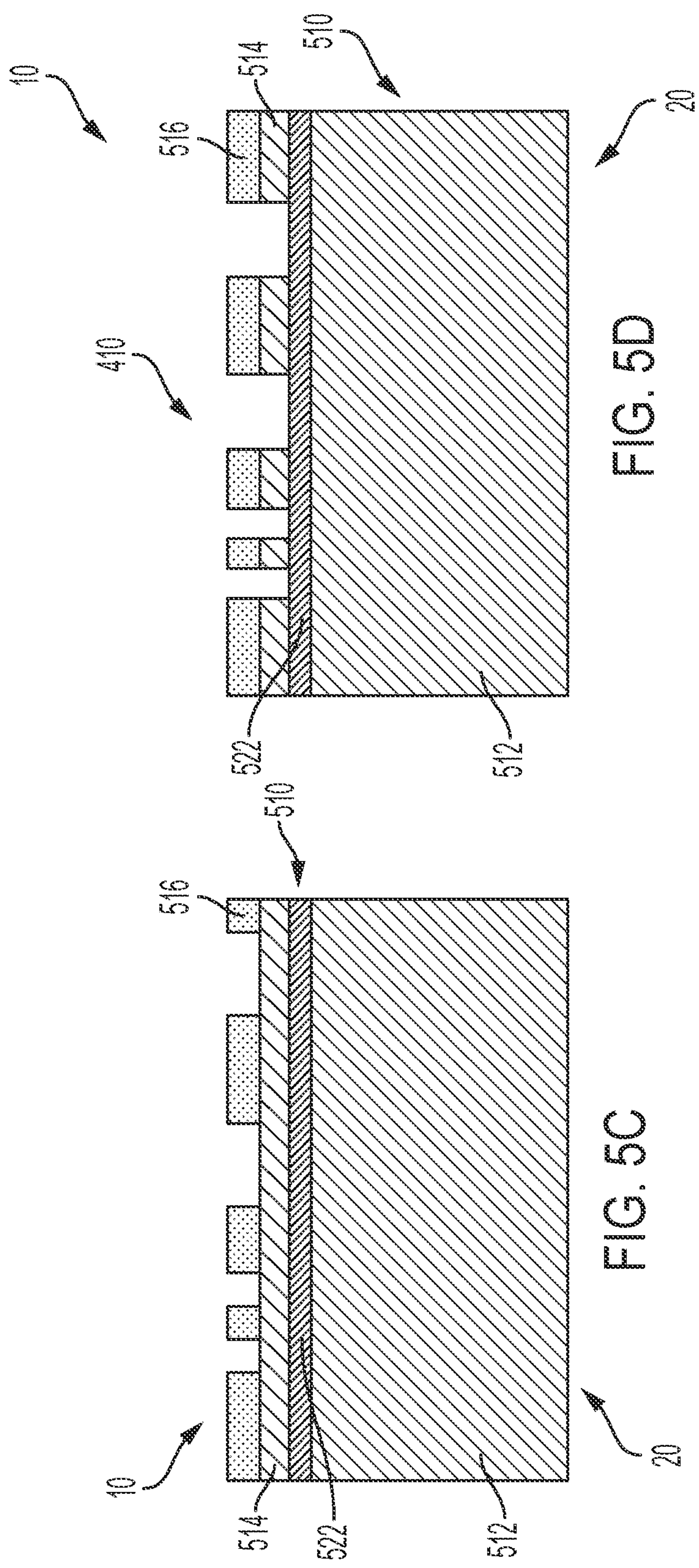
Figures 5E, 5F:
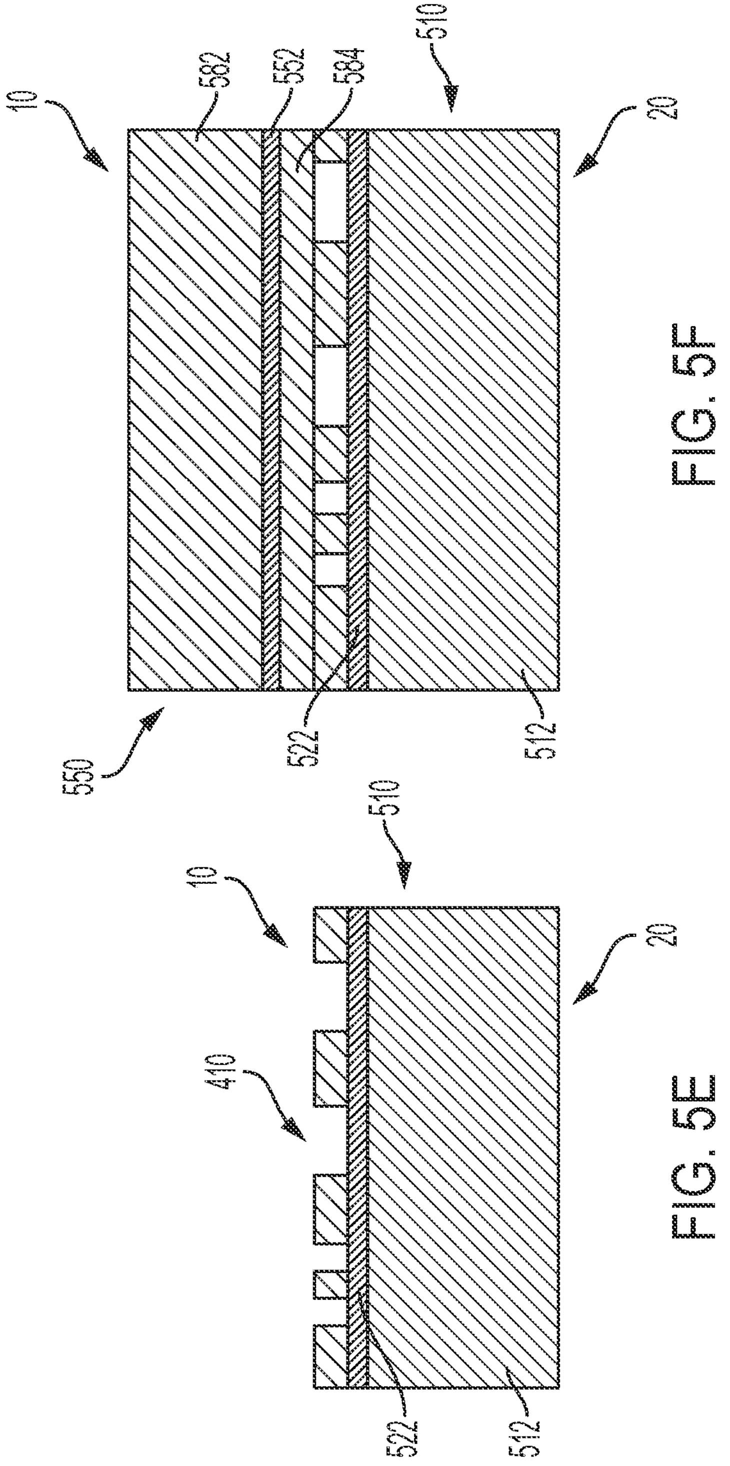
Figures 5G, 5H, 5I:
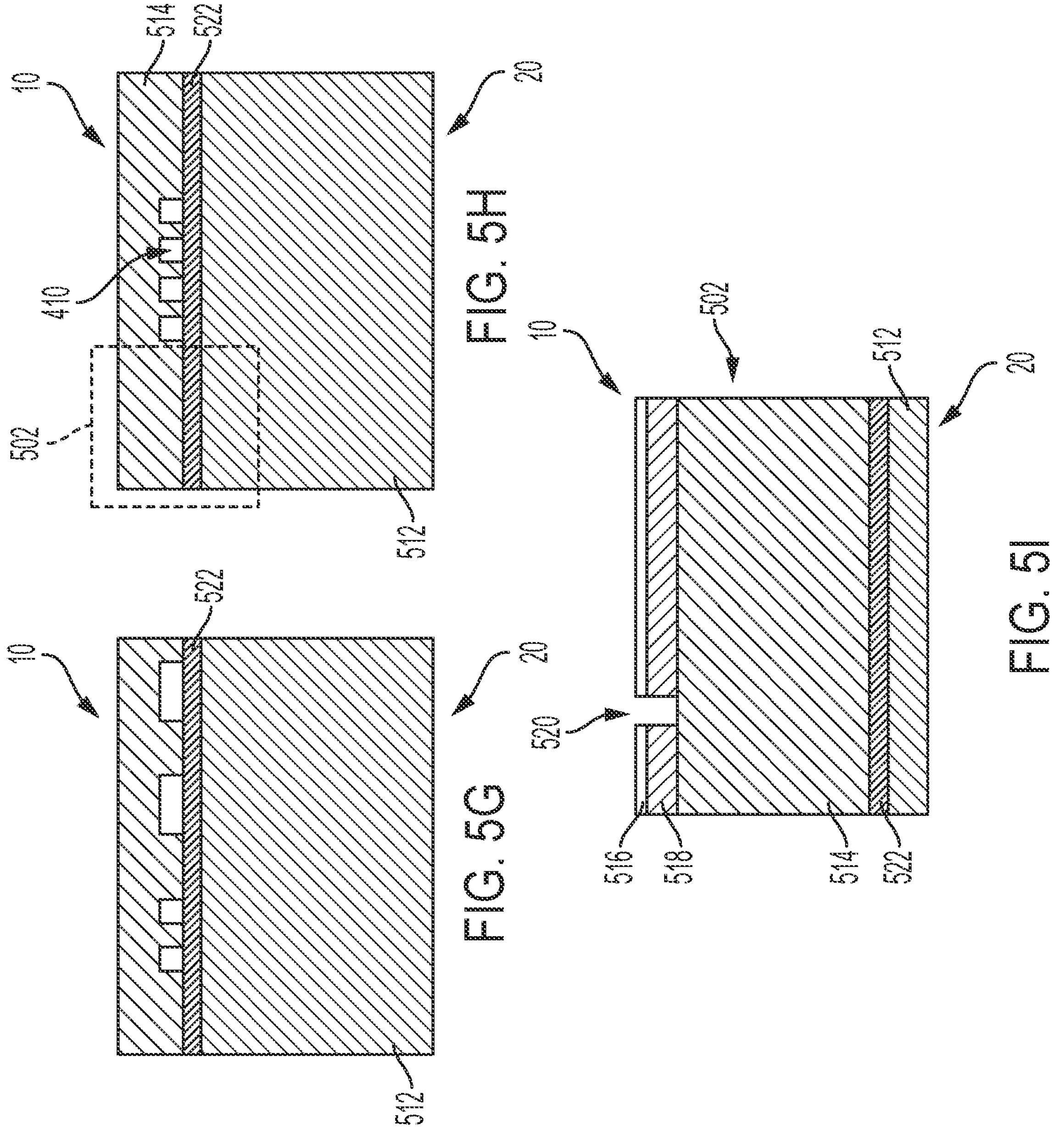
Figures 5J, 5K:
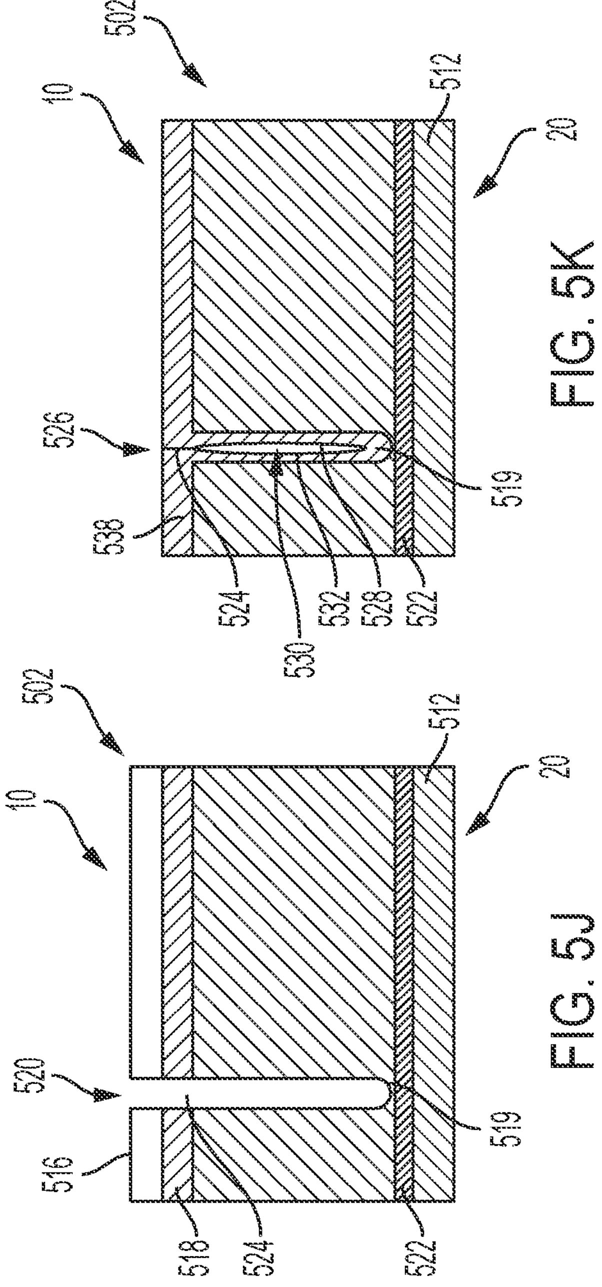
Figures 5L, 5M:
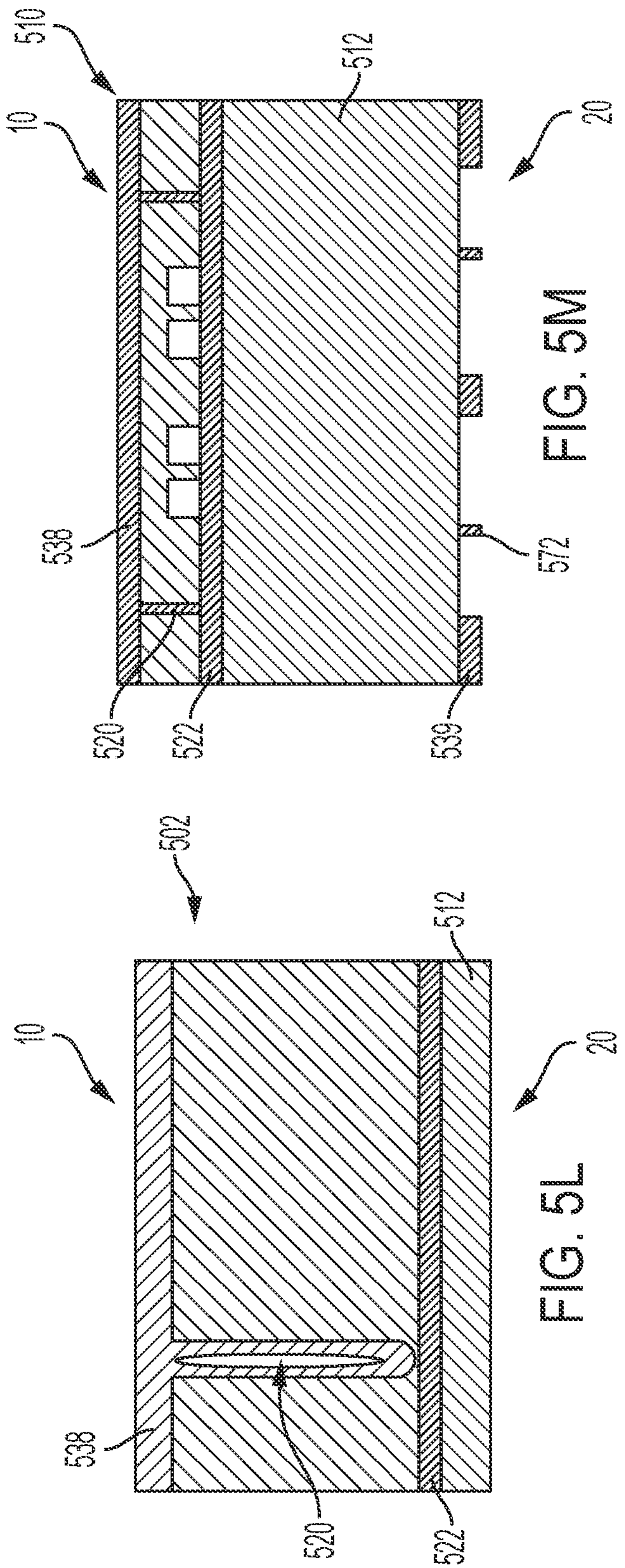
Figures 5N, 5O:
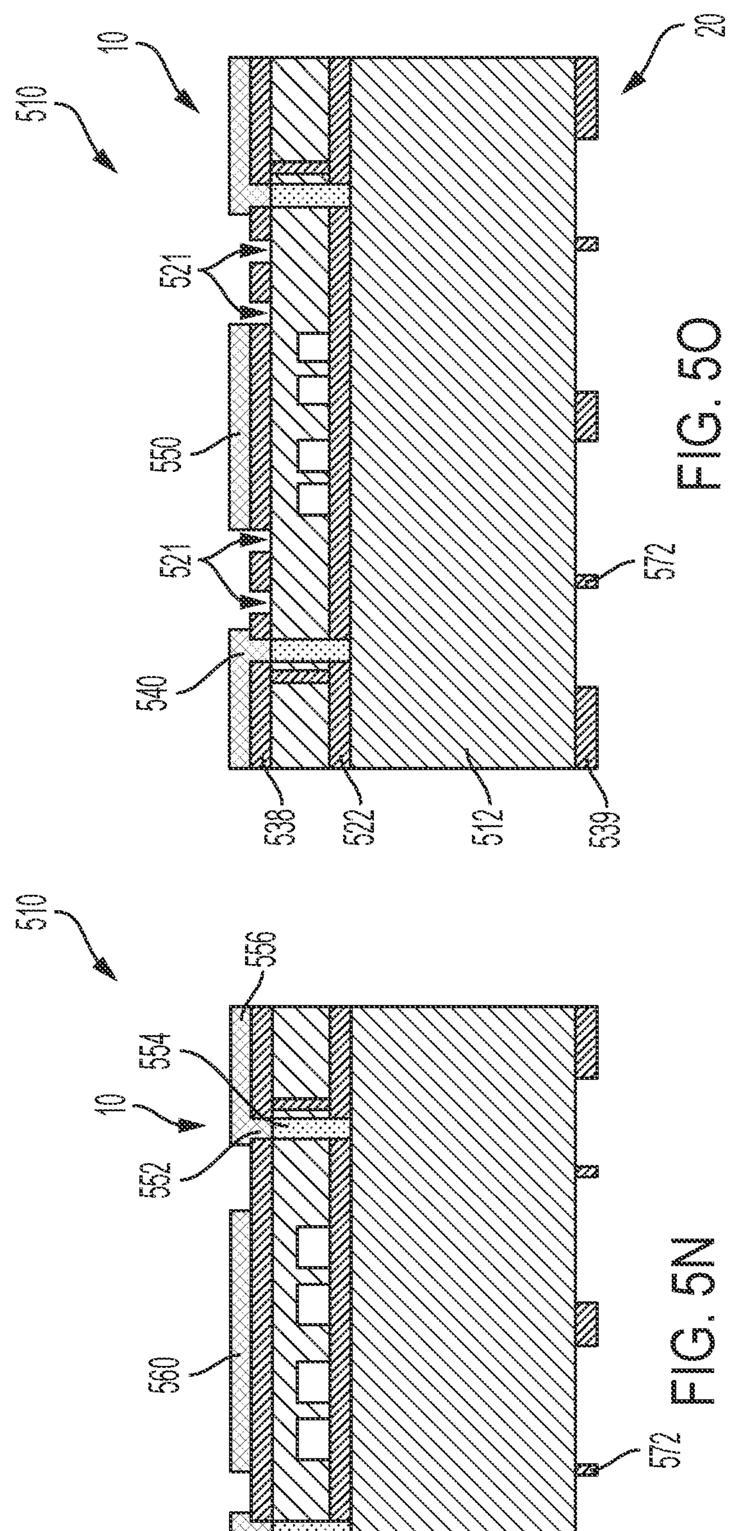
Figures 5P, 5Q:
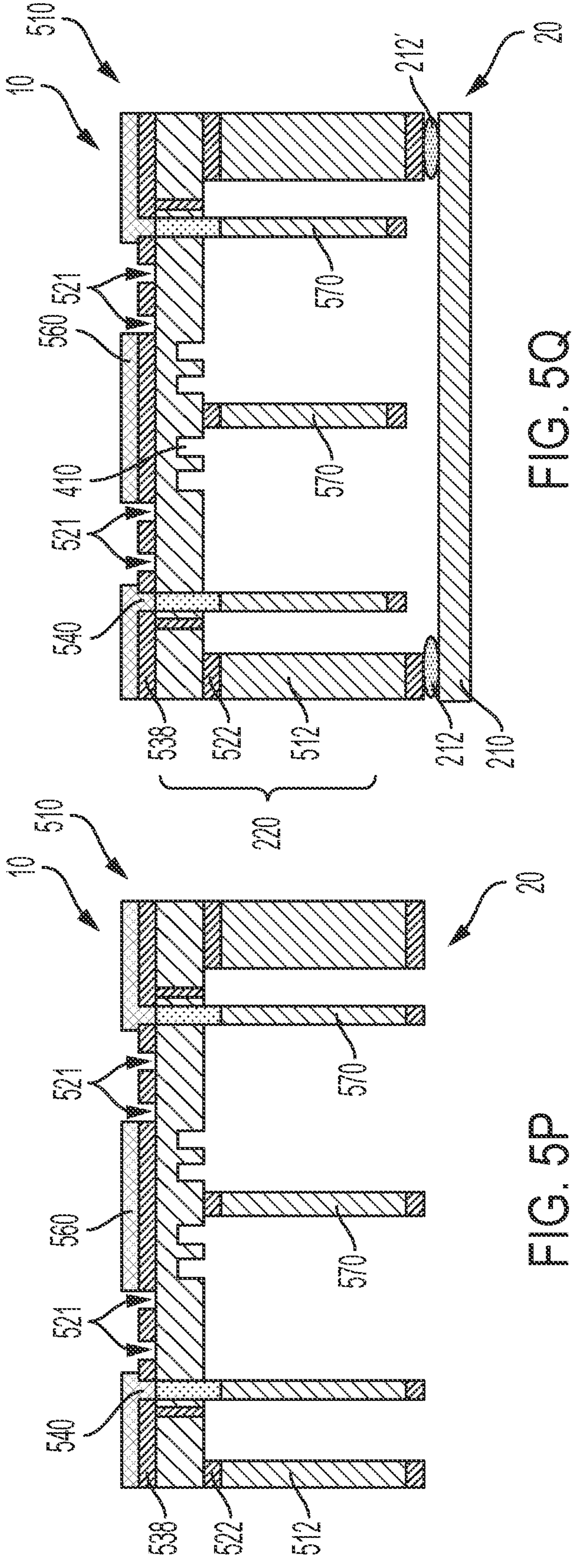
Figure 5R:
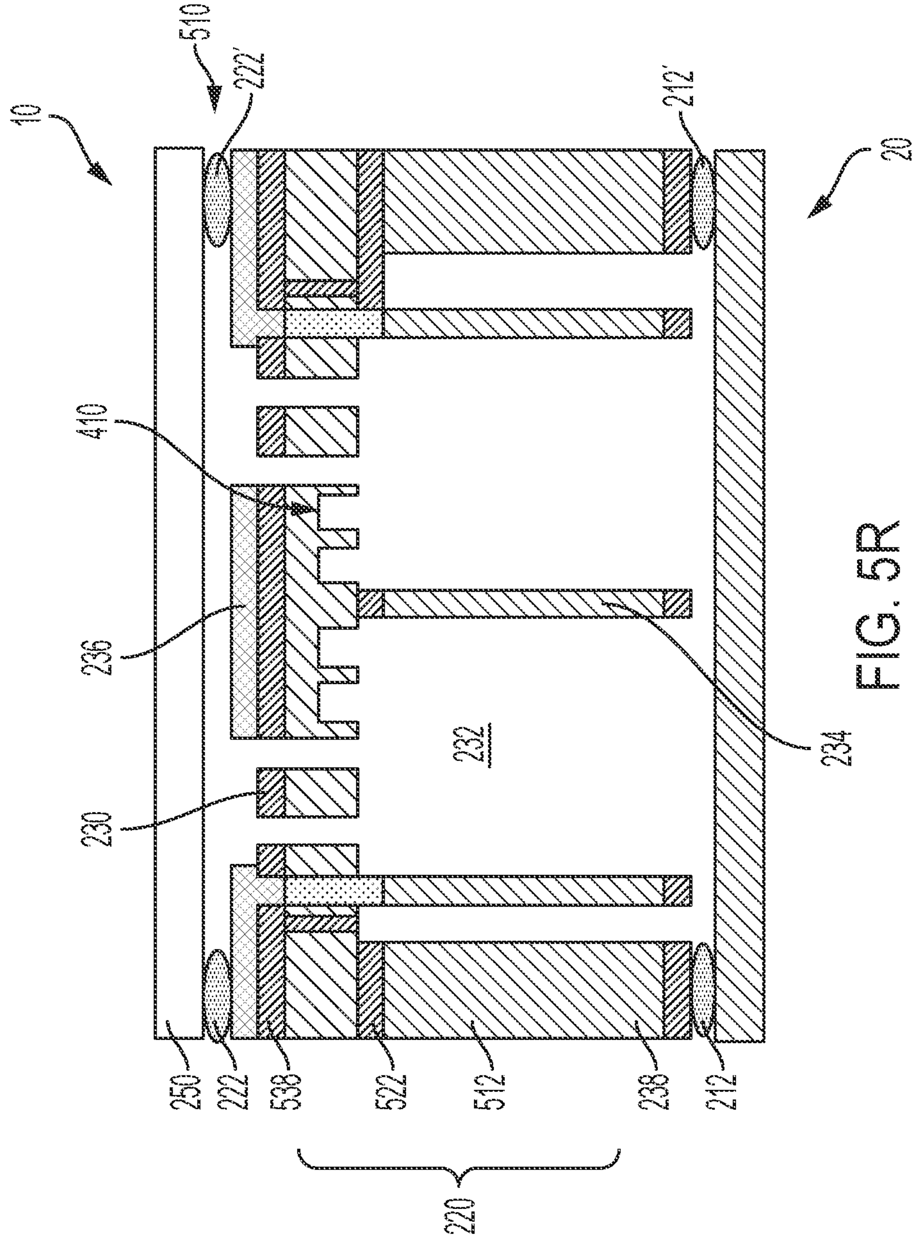

FIGS. 5A-R illustrate process steps for fabricating micromirrors with the recessed or honeycombed areas shown in FIGS. 4A-D, and other recessed patterns within the scope of this disclosure. The process starts with a silicon-on-insulator (SOI) wafer 510 (hereinafter also referred as "first silicon wafer" or "first substrate") as shown in FIG. 5A. As illustrated in FIG. 5A, in some implementations, the first silicon wafer 510 includes a top silicon layer 514 having a thickness between 10 μm and 35 μm and a bottom silicon layer having a thickness between 250 μm and 500 μm. As shown in FIG. 5A, in some implementations, the substrate includes a buried oxide layer 522 having a thickness between 0.5 μm and 2.0 μm disposed between the top silicon layer 514 and the bottom silicon layer 512.

FIG. 5A illustrates a cross-section of a first silicon wafer 510 that is chosen to be in the thickness range of 300-600 micrometers (μm) according to some implementations of this disclosure. The first silicon wafer 510 has a topside 10 (or device side or simply a top) and a backside or bottom side 20 and forms a plurality of layers. Each layer within the MEMS mirror array is formed from the first silicon wafer 510 has a top surface oriented towards topside 10 and a bottom surface oriented towards bottom side 20. As discussed above, in some implementations, the first silicon wafer 510 includes the top silicon layer 514 having a thickness between 10 μm and 35 μm, the bottom silicon layer 512 having a thickness between 250 μm and 500 μm, the buried oxide layer 522, disposed between the top silicon layer 514 and the bottom silicon layer 512, having a thickness between 0.5 μm and 2.0 μm.

FIG. 5B illustrates a photoresist layer 516 disposed on the top surface of the first silicon wafer 510 in a MEMS mirror array according to some implementations of this disclosure. As shown in FIG. 5C, in some implementations, the photoresist layer 516 is patterned using photolithography. In some implementations, the pattern etched in FIG. 5C is further etched using a suitable etching technique (e.g., deep reactive ion etching) to achieve a pattern as shown in FIG. 5D. As shown in FIG. 5D, the etching stops on the buried oxide layer 522. This deep etching creates the recessed area 410 (e.g., a plurality of recess areas) in honeycomb pattern shown in FIGS. 4A-D. The pattern of the etched portion of the top silicon layer 514 (i.e., recessed area 410) can have various shapes, including an oval shaped recessed area, a rectangular shaped recessed area, a parallelogram recessed area, a triangular recessed area, or a hexagon shaped recessed area. The photoresist layer 516 is then stripped or removed as shown in FIG. 5E.

FIG. 5F illustrates a second silicon-on-insulator (SOI) wafer 550 (hereinafter "second silicon wafer" or "second substrate") disposed on the first silicon wafer 510 in FIG. 5E according to some implementations of this disclosure. In some implementations, similar to the first silicon wafer 510, the second silicon wafer 550 includes a second top silicon layer 584 having a thickness between 5 μm and 35 μm, a second bottom silicon layer 582 having a thickness between 250 μm and 500 μm, a second buried oxide layer 552, disposed between the second top silicon layer 584 and the second bottom silicon layer 582, having a thickness between 0.5 μm to 2.0 μm. As shown in FIG. 5F, the second top silicon layer 584 of the second silicon wafer 550 is nearest the upper surface of the first silicon wafer 510. In some implementations, the Si—Si bond is formed between the top surface of the first silicon wafer 510 and the top surface of the second silicon wafer 550 which is flipped to face the top surface of the first silicon wafer 510 as shown in FIG. 5F. As a result, the top silicon layer 514 includes the second top silicon layer 584.

In some implementation, the second bottom silicon layer 582 and the second buried oxide layer 552 of the second silicon wafer 550 are removed through a series of grinding, polishing and etching steps as seen in FIG. 5G.

Manufacturing of the mirrors follows the steps outlined in FIGS. 5H-R.

FIGS. 5I-5L illustrate the upper left hand portion 502 shown in FIG. 5H of the first silicon wafer 510 in a MEMS mirror array 100 which illustrates fabrication techniques for of isolation trenches 520 on the topside 10 of first silicon wafer 510 according to some implementations of this disclosure. The isolation trenches 520 are filled with a dielectric material (e.g., silicon dioxide). Once filled with the dielectric material, the isolation trenches 520 provide electrical isolation between blades after the mirror is released. A dielectric layer 518 also remains on the surface of the first silicon wafer 510 and is planarized after the isolation trench fill process to ease subsequent lithographic patterning and eliminate surface discontinuities.

Referring to FIG. 5I, a first silicon wafer 510 is provided with a dielectric layer 518 according to some implementations of this disclosure. The dielectric layer 518 can be silicon dioxide (e.g., an oxide layer). The first silicon wafer 510 can be of arbitrary doping, resistivity, and crystal orientation, because the process depends only on reactive ion etching to carve and form the structures. In this example, the dielectric layer 518 serves the function of protecting the upper surface of the first silicon wafer 510 during the isolation trench etching process, and thus represents a masking layer. This masking layer can be formed from any number of techniques, including thermal oxidation of silicon or chemical vapor deposition (CVD). In some implementations, a thickness of the dielectric layer 518 is between 0.5

μm and 1.0 μm. As shown in FIG. 5I, in some implementations, a photoresist layer 516 is then spun onto the first silicon wafer 510 and exposed and developed using standard photolithography techniques to define the isolation trench pattern for the isolation trench 520. In some implementations, reactive ion etching is used to transfer the photoresist pattern to the dielectric layer 518, exposing the top surface of the top silicon layer 514 of the first silicon wafer 510. Typically, the silicon dioxide mask is etched in Freon gas mixture, for example $CHF_3$ or $CF_4$. High etch rates for silicon dioxide etching are achieved using a high density plasma reactor, such as an inductively coupled plasma ("ICP") chamber. These ICP chambers use a high power RF source to sustain the high density plasma and a lower power RF bias on the wafer to achieve high etch rates at low ion energies. Oxide etch rates of 200 nm/min and selectivities to photoresist greater than 1:1 are common for this hardware configuration.

As illustrated in FIG. 5J, in some implementations, an isolation trench 520 is formed in the first silicon wafer 510 by deep reactive ion etching of silicon using high etch rate, high selectivity etching. The trench is commonly etched in a high-density plasma using a sulfur hexafluoride ($SF_6$) gas mixture as described in U.S. Pat. No. 5,501,893. Preferably, etching is controlled so that the isolation trench 520 profile is reentrant, or tapered, with the top 524 of the isolation trench 520 being narrower than the bottom 519 of the isolation trench 520. Tapering of the isolation trench 520 ensures that good electrical isolation is achieved in subsequent processing. Profile tapering can be achieved in reactive ion etching by tuning the degree of passivation, or by varying the parameters (e.g., power, gas flows, pressure) of the discharge during the etching process. Because the isolation trench 520 is filled with dielectric material, the opening at the top 524 of the isolation trench 520 is typically less than 2 μm in width in some implementations. The depth of the isolation trench 520 is typically in the range between 10 μm and 50 μm in some implementations. In some implementations, a procedure for etching the isolation trench 520 is to alternate etch steps ($SF_6$ and argon mixture) with passivation steps (Freon with argon) in an ICP plasma to achieve etch rates in excess of 2 μm/min at high selectively to photoresist (>50:1) and oxide (>100:1). The power and time of the etch cycles are increased as the trench deepens to achieve the tapered profile. Although the trench geometry is preferably reentrant, arbitrary trench profiles can be accommodated with adjustments in microstructure processing. Good isolation results can be achieved with any of a number of known trench etch chemistries. After the silicon trench is etched, in some implementations, the photoresist layer 516 is removed with wet chemistry or dry ashing techniques, and the dielectric layer 518 is removed with a reactive ion etch ("RIE") or buffered hydrofluoric acid.

Referring to FIG. 5K, the isolation trench 520 is then filled with an insulating dielectric material, typically silicon dioxide according to some implementations of this disclosure. The filling procedure results in the mostly solid isolation segment in the isolation trench 520, and serves to deposit a layer of dielectric material on the topside 10 (upper surface) of the silicon wafer 510 and dielectric layers on the sidewall 528 and bottom 519 of the isolation trench 520. The thickness of the deposited layer is usually in excess of 1 μm. This fill can be accomplished with chemical vapor deposition ("CVD") techniques or preferably with oxidation of silicon at high temperatures. In thermal oxidation, the wafer is exposed to an oxygen rich environment at temperatures between 900° C. and 1150° C. This oxidation process consumes silicon surfaces to form silicon dioxide. The resulting volumetric expansion from this process causes the sidewalls of the trenches to encroach upon each other, eventually closing the trench opening. In a CVD fill, some dielectric is deposited on the walls but filling also occurs from deposition on the bottom of the trench. CVD dielectric fill of trenches has been demonstrated with TEOS or silane mixtures in plasma enhanced CVD chambers and low pressure CVD furnace tubes.

During the isolation trench 520 filling process, it is common for most isolation trench profiles to be incompletely filled, causing an interface 532 and a void 530 to be formed in the isolation trench 520. A local concentration of stress in the void 530 can cause electrical and mechanical malfunction for some devices, but is generally unimportant for micromechanical devices due to the enclosed geometry of the isolation trench 520. The interface 532 and void 530 can be eliminated by shaping the isolation trench 520 to be wider at the isolation trench opening located at the top of the isolation trench 520 than the bottom 519 of the isolation trench 520. However, good electrical isolation would then require additional tapering of the microstructure trench etch in the later steps. Another artifact of the isolation trench filling process is an indentation 526 that is created in the surface of the dielectric layer 538 centered over the isolation trench 520. This indentation is unavoidable in most trench filling processes, and can be as deep as 0.5 μm, depending on the thickness of the deposition. To remove the indentation 526, in some implementations, the surface is planarized to form a flat, or substantially flat, surface, as illustrated in FIG. 5L, for subsequent lithographic and deposition steps. Planarization is performed using chemical mechanical polishing (CMP). Planarization may also be performed by depositing a viscous material, which can be photoresist, spin-on glass, or polyimide, and flowing the material to fill the indentation 526 to a smooth finish. During etchback, which is the second step of planarization, the surface is etched uniformly, including the filled indentation. Therefore, by removing part of the surface oxide layer, the indentation 526 is removed to create a uniform thickness layer. For example, if the original dielectric layer 538 is 2 μm, then planarization to remove the indentation 526 leaves a dielectric layer 538 having a final thickness of less than 1 μm. The topside 10 (upper) surface of first silicon wafer 510 is free from imperfection and is ready for further lithography and deposition.

FIG. 5M shows the first silicon wafer 510 with the dielectric layer 538 and the isolation trenches 520 discussed above. After the isolation trenches 520 are fabricated, standard front-to-back alignment is used to lithographically pattern the masking layer for the blades on the bottom side 20 (back side) of the first silicon wafer 510 according to some implementations of this disclosure. The blade pattern 572 is exposed and etched into a dielectric layer 539. The dielectric layer 539 is typically a masking layer comprised of a combination of thermally grown silicon oxide and oxide deposited by chemical vapor deposition. The lithography pattern is transferred in the masking layer by reactive ion etching, yet the silicon blade etching is not completed until later in the process. Without the blades etched, the wafer is easily processed through the remaining device layers. The backside of the blade pattern 572 is typically aligned to the topside isolation trenches 520 to within several microns.

Metallization on the topside 10 of the first silicon wafer 510 then proceeds as illustrated in FIG. 5N according to some implementations of this disclosure. In order to make contact to the underlying first silicon wafer 510, vias 552 are patterned and etched into the dielectric layer 518 using standard lithography and reactive ion etching. After the vias 552 are etched, metal is deposited to form a metal layer 540 and patterned to form an interconnect 556 and a contact 554 to the first silicon wafer 510 through the vias 552. In some implementations, the metal is aluminum and is patterned using wet etching techniques. In mirror arrays with high interconnect densities, it is advantageous to pattern the metal using dry etching or evaporated metal lift-off techniques to achieve finer linewidths. In some implementations, the metal layer 540 is used to provide bond pads and interconnects, which connect electrical signals from control circuitry to each mirror to control mirror actuation.

As illustrated in FIG. 5N, in some implementations, a deposition of a second metal layer 560 provides a reflective mirror surface. As will be appreciated by those skilled in the art the second metal layer 560 can be the same metal as the first metal layer 540, such as aluminum. Alternatively, the second metal layer 560 can be a different metal, such as a metal that is more reflective than aluminum for certain wavelengths of lights (e.g., gold). This metal is tuned to provide high mirror reflectivities at the optical wavelengths of interest, and is typically evaporated and patterned using lift-off techniques to allow a broader choice of metallizations. In some implementations, the metallization is comprised of 500 μm of aluminum. However, in some implementations, additional metal stacks such as Cr/Pt/Au may be used to increase reflectivities in the wavelength bands common to fiber optics. Because the metals are deposited under stress and will affect the eventual mirror flatness, it is advantageous to reduce the thickness of the dielectric layer 538 in the region of the mirror. This can be accomplished through the use of dry etching of the underlying dielectric prior to evaporation.

In FIG. 5O, the topside patterning is completed according to some implementations of this disclosure. In some implementations, a passivation dielectric 542 (not shown) on the metal surfaces and may be applied to protect the metallization during subsequent processing. The passivation is removed in the region of the bonding pads. In some implementations, the mirror structure including frame, mirror, and supports are defined by trenches 521 separating the structural elements. The lithography pattern is transferred in the masking layer(s) by reactive ion etching, yet the silicon etching is not completed until later in the process. The etches are self-aligned and proceed through the various metal, dielectric, and various layers of the first silicon wafer 510.

As shown in FIG. 5P, in some implementations, backside silicon etching transfers the blade pattern 572 into the first silicon wafer 510 to obtain the blades 570. In some implementations, the etching is performed using deep silicon etching at high selectivity to oxide using the techniques disclosed in U.S. Pat. No. 5,501,893. The deep silicon etching achieves near vertical profiles in the blades 570, which can be nominally between 5 μm and 20 μm wide and in excess of 300 μm deep. The etch stops on the buried oxide layer 522 to provide a uniform depth across the wafer while not punching through the topside 10 surface of the silicon wafer 510. In some implementations, all blades 570 can be etched simultaneously across the mirror element and across the mirror array. The buried oxide layer 522 exposed by the deep silicon etch is then subsequently removed using a reactive ion etch that stops on silicon.

Referring to FIG. 5Q, because the first silicon wafer 510 is now prepared for microstructure release, the first silicon wafer 510 becomes more susceptible to yield loss due to handling shock or air currents. In order facilitate handling and aid in hermetically sealing the mirror array, in some implementations, the first silicon wafer 510 is disposed on a base wafer 210 (hereinafter also referred as "base" or "base substrate"). Then the base wafer 210 is bonded to the first silicon wafer 510 to protect the blades after release. As shown in FIG. 5Q, in some implementations, the base wafer 210 is bonded to the dielectric layer 539 of the first silicon wafer 510. In some implementations, the bonding is accomplished through the use of a frit glass material bonding element (bottom bonding element), that is heated to its flow temperature and then cooled. In this manner, a 400° C. temperature bond produces a the bonding elements 212, 212' produce a hermetic seal to surround the entire mirror array. The separation between the first silicon wafer 510 and the base wafer 210 using the frit glass material bonding element allows the blades 570 to swing through high rotation angles without impedance. Typically, the standoff required is greater than 25 μm. As shown in FIG. 5Q, in some implementations, the base wafer 210 is overlapped with the blades 570 in a first direction (e.g., vertical direction).

Final structure release is accomplished on the wafer topside in FIG. 5R using dry etching, which punctures through the trenches 521 to suspend the movable elements of the mirror 236 and the frame 230 according to some implementations in this disclosure. In addition, the release etch promotes electrical isolation by separating, for example, the silicon of the frame 230 from the silicon of surrounding members and device wafer 220. The vias 552 serve to connect the regions of silicon to the metal interconnects 556 (shown in FIG. 5N). To completely seal the mirrors from the outside environment, in some implementations, a lid wafer 250 (hereinafter also referred as "lid" or "lid substrate") is disposed on the first silicon wafer 510. Then the lid wafer 250 is bonded to the first silicon wafer 510, preferably through the bonding elements 222, 222' (e.g., top bonding element such as frit glass seal). As shown in FIG. 5R, in some implementations, the lid wafer 250 is bonded to the metal layer 540 of the first silicon wafer 510. Similar to the base wafer 210, in some implementations, heat is applied to the bonding element 222, 222', such as frit glass seals, to fuse or couple the lid wafer 250 to the first silicon wafer 510. In some implementations, the lid wafer 210 is overlapped with the first silicon wafer 510 in the first direction (e.g., vertical direction). In some implementations, the lid wafer 210 (e.g., lid) is overlapped with the base wafer 210 in the first direction. As shown in FIG. 5R, in some implementations, the lid wafer 250 is overlapped with the first silicon wafer 510 and the base wafer 210 in the first direction. The lid wafer 250 can include glass (and/or other suitable material) that allows incoming light to be transmitted with low loss in the mirror cavity 232, reflect off of the upper surface of the mirror 236, and transmit out of the mirror cavity 232. As shown FIG. 5R, in some implementations, the mirror cavity 232 is disposed between blades 234 and at least one of the blades 234 is overlapped with the mirror 236 in the first direction. In some implementations, the mirror 236 is overlapped with the recessed area 410 in the first direction.

The resulting process provides an additional buried oxide layer, deeper vias and honeycomb recesses. Thus, the MEMS have higher resonant frequency and mirrors with less coupling to external vibration. This provides an optical switch system, or optical circuit switch, that is less prone to error in switching and potentially faster switching times. As will be appreciated by those skilled in the art, a mirror cavity can be provided between the first blade and the second blade. Additionally, a plurality of blades can be provided where the first blade is overlapped is overlapped with the central stage, (including the plurality of recessed areas), the lid substrate and base substrate can overlap the central stage (including the plurality of recessed areas), and/or the plurality of recessed areas can overlap the mirror.

Figure 6:
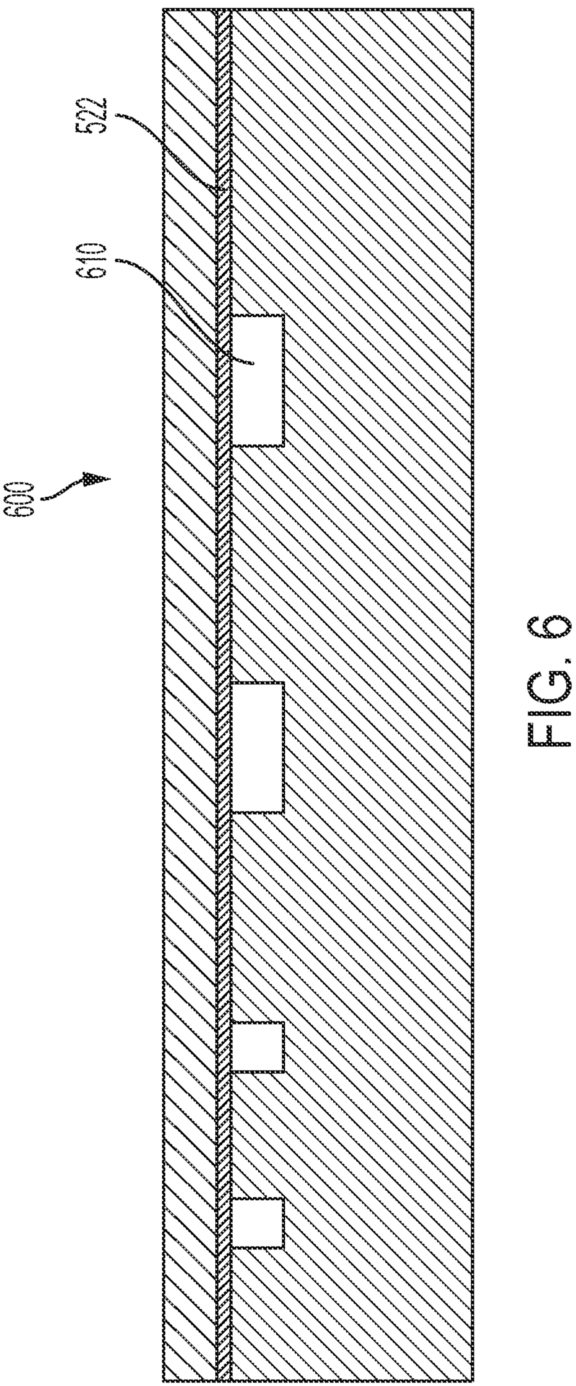
FIG. 6 illustrates an SOI wafer with a cavity.

FIG. 6 illustrates a cavity SOI wafer 600. In this configuration, the wafer manufacturer pre-etches a pattern of honeycomb recesses 610 into the wafer during the manufacturing process according to some implementations of this disclosure. The buried oxide layer 522 is then positioned above the recesses rather than below the recesses as shown above in FIG. 5. As will be appreciated by those skilled in the art, when the deep reactive ion etch process described above is performed to define the blade electrodes (as shown in FIG. 5P), the etch stops when it reaches the buried oxide layer 522. Therefore, in this configuration, the etch process would be a time-controlled to allow the blade electrodes to be etched. Additionally, the mirror structure would have an oxide layer positioned between two silicon layers, which could result in warping or bowing the mirror.

Figure 7:
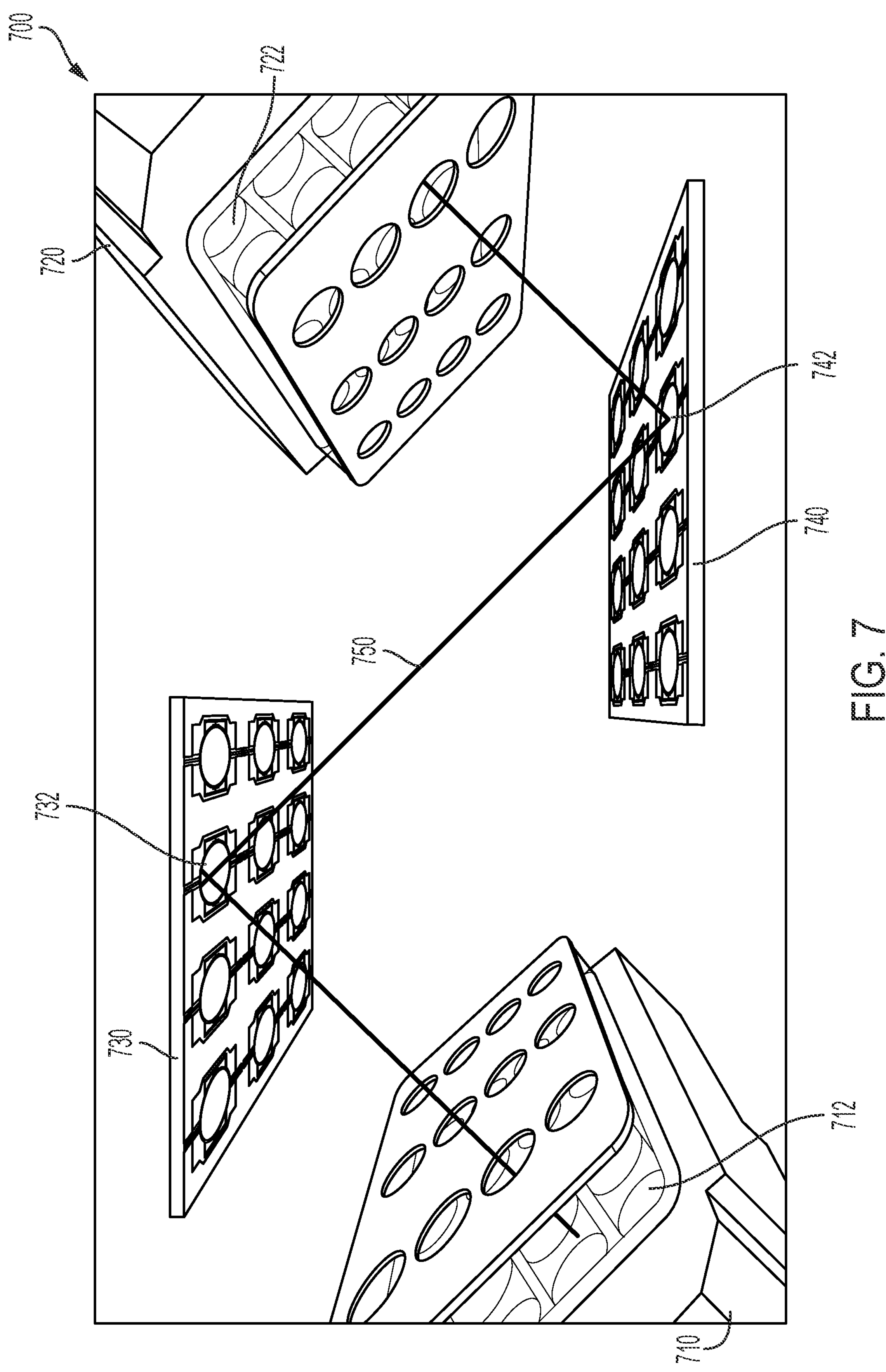
FIG. 7 illustrates an optical (circuit) switch implemented with mirror arrays.

FIG. 7 illustrates an optical (circuit) switch 700 implemented with switch mirror arrays 730, 740. The optical switch 700 can be configured as a switching device that couples light beams 750 from one of input fibers 712 in an input fiber module 710 to one of output fibers 722 in an output fiber module 720. As shown, the light beam 750 from the input fiber 712 is collimated and directed toward a desired output fiber 722. A movable mirrors 732, 742 in a switch mirror arrays 730, 740 redirect the light beam 750 to a desired location (one of the output fibers 722 in this example). Each of the switch mirror arrays 730, 740 in FIG. 7 can be configured with a plurality of moveable mirrors 732, 742 that are operable to direct (and redirect) the light beam 750. Moreover, the optical switch 700 can also include at least one switch mirror array 730, 740 with at least one moveable mirror 732, 742 operable to implement the features discussed in FIGS. 3-6.

While preferred implementations of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the claims define the scope of the invention and that methods and structures within the scope of these claims and their equivalents be covered thereby.

What is claimed:

1. A moveable mirror, comprising:
- a stationary frame including a cavity;
- a movable frame disposed in the cavity;
- a central stage disposed in the cavity, the central stage being configured to tilt or rotate about an axis; and
- a mirror disposed on the central stage, wherein the central stage comprises
- an un-recessed portion having a first finite thickness, and
- a plurality of recessed areas adjacent to the un-recessed portion, each of the plurality of recessed areas having a second finite thickness that is less than the first finite thickness, wherein the un-recessed portion comprises
- a first un-recessed segment extending in a first direction and having a first uniform width, wherein the first direction extends along the axis, and
- a second un-recessed segment extending in a second direction and having a second uniform width,
- wherein the first un-recessed segment and the second un-recessed segment intersect perpendicularly.

2. The moveable mirror of claim 1, wherein the mirror includes aluminum, wherein the central stage includes silicon.

3. The moveable mirror of claim 1, wherein the recessed areas form a honeycomb pattern on a surface of the central stage.

4. The moveable mirror of claim 1, wherein the plurality of recessed areas includes at least one of a circular shaped recessed area, an oval shaped recessed area, a rectangular shaped recessed area, a parallelogram recessed area, a triangular recessed area, or a hexagon shaped recessed area.

5. The moveable mirror of claim 1, further comprising a plurality of blades, the plurality of blades including a first blade and a second blade, wherein the first blade is overlapped with the central stage including the plurality of recessed areas.

6. The moveable mirror of claim 5, further comprising a mirror cavity between the first blade and the second blade.

7. The moveable mirror of claim 1, further comprising a lid substrate and a base substrate that are overlapped with the central stage including the plurality of recessed areas.

8. The moveable mirror of claim 1, wherein the plurality of recessed areas is overlapped with the mirror.

9. A mirror array, comprising the movable mirror of claim 1.

10. An optical circuit switch, comprising the mirror array of claim 9.

11. A moveable mirror, comprising:
- a first cover;
- a second cover;
- a device wafer disposed between the first cover and the second cover, the device wafer comprising a cavity;
- a central stage disposed in the cavity and configured to tilt about an axis;
- a first surface of the central stage, the first surface comprising
- a recessed area having a first finite thickness and including a plurality of recessed section, and
- an un-recessed area having a second finite thickness greater than the first finite thickness, the un-recessed area including a plurality of un-recessed portions interspersed between the recessed sections,
- wherein the un-recessed portions form a symmetrically or substantially symmetrically pattern dividing the recessed area,
- wherein the un-recessed area comprises
- a first un-recessed portion extending in a first direction and having a first uniform width, wherein the first direction extends along the axis,
- a second un-recessed portion extending in a second direction and having a second uniform width, wherein the first un-recessed portion and the second un-recessed portion intersect perpendicularly, and
- a mirror disposed on a second surface of the central stage, the second surface opposing the first surface.

12. The moveable mirror of claim 11, wherein the recessed sections are quarter-circle or quarter-oval shapes arranged to form a circular or oval pattern.

13. The moveable mirror of claim 11, wherein the un-recessed area has a web-like shape.

14. The moveable mirror of claim 11, wherein the recessed sections include a parallelogram shaped recessed section.

15. The moveable mirror of claim 11, wherein the recessed sections include a rectangular shaped recessed section.

16. The moveable mirror of claim 11, wherein the recessed sections include a hexagon shaped recessed section.

17. The moveable mirror of claim 11, wherein the recessed sections are arranged in a honeycomb pattern.

18. The moveable mirror of claim 11, wherein the unrecessed portions define separations that are shaped as circles, ovals, squares, hexagons, rectangles, parallelograms, or triangles.

19. The moveable mirror of claim 11, wherein a number of recessed sections is four or more.

20. The moveable mirror of claim 11, wherein the mirror includes aluminum, and wherein the central stage includes silicon.

21. The moveable mirror of claim 11, further comprising a first bonding element and a second bonding element between the device wafer and the first cover.

22. The moveable mirror of claim 11, further comprising a first bonding element and a second bonding element between the device wafer and the second cover.

23. The moveable mirror of claim 11, wherein the central stage is suspended from a first frame within the cavity using a first flexure and a second flexure between the central stage and the first frame.

24. The moveable mirror of claim 23, wherein the first frame is suspended from a second frame within the cavity using a third flexure and a fourth flexure between the first frame and the second frame.

25. The moveable mirror of claim 24, wherein the first frame is moveable, and the second frame is stationary.

26. A mirror array, comprising the movable mirror of claim 11.

27. An optical circuit switch, comprising the mirror array of claim 26.

* * * * *